United States Patent [19]
Tazaki

[11] 4,368,413
[45] Jan. 11, 1983

[54] RECORDING APPARATUS

[75] Inventor: Shigemitsu Tazaki, Matsudo, Japan

[73] Assignee: Canon Kabushiki Kaisha, Tokyo, Japan

[21] Appl. No.: 192,218

[22] Filed: Sep. 30, 1980

[30] Foreign Application Priority Data

Oct. 26, 1979 [JP] Japan ............................... 54/139553

[51] Int. Cl.³ ............................................. G05B 11/00

[52] U.S. Cl. .................................... 318/687; 318/135; 318/640; 318/616

[58] Field of Search ................ 318/687, 135, 640, 616

[56] References Cited

U.S. PATENT DOCUMENTS

| | | | |
|---|---|---|---|
| 3,708,681 | 1/1973 | Ivers | 318/640 UX |
| 3,737,883 | 6/1973 | Sordello et al. | 318/687 UX |
| 3,839,664 | 10/1974 | Dirks et al. | 318/687 |
| 4,012,676 | 3/1977 | Giebler | 318/687 |
| 4,024,447 | 5/1977 | Epstein | 318/696 |

*Primary Examiner*—B. Dobeck
*Attorney, Agent, or Firm*—Fitzpatrick, Cella, Harper & Scinto

[57] ABSTRACT

There is a recording apparatus utilizing a linear motor in which a movable carriage is provided with a detector for detecting its speed and position while the apparatus itself is provided with a detector for detecting the initial position of the carriage.

5 Claims, 16 Drawing Figures

FIG. 5B-I
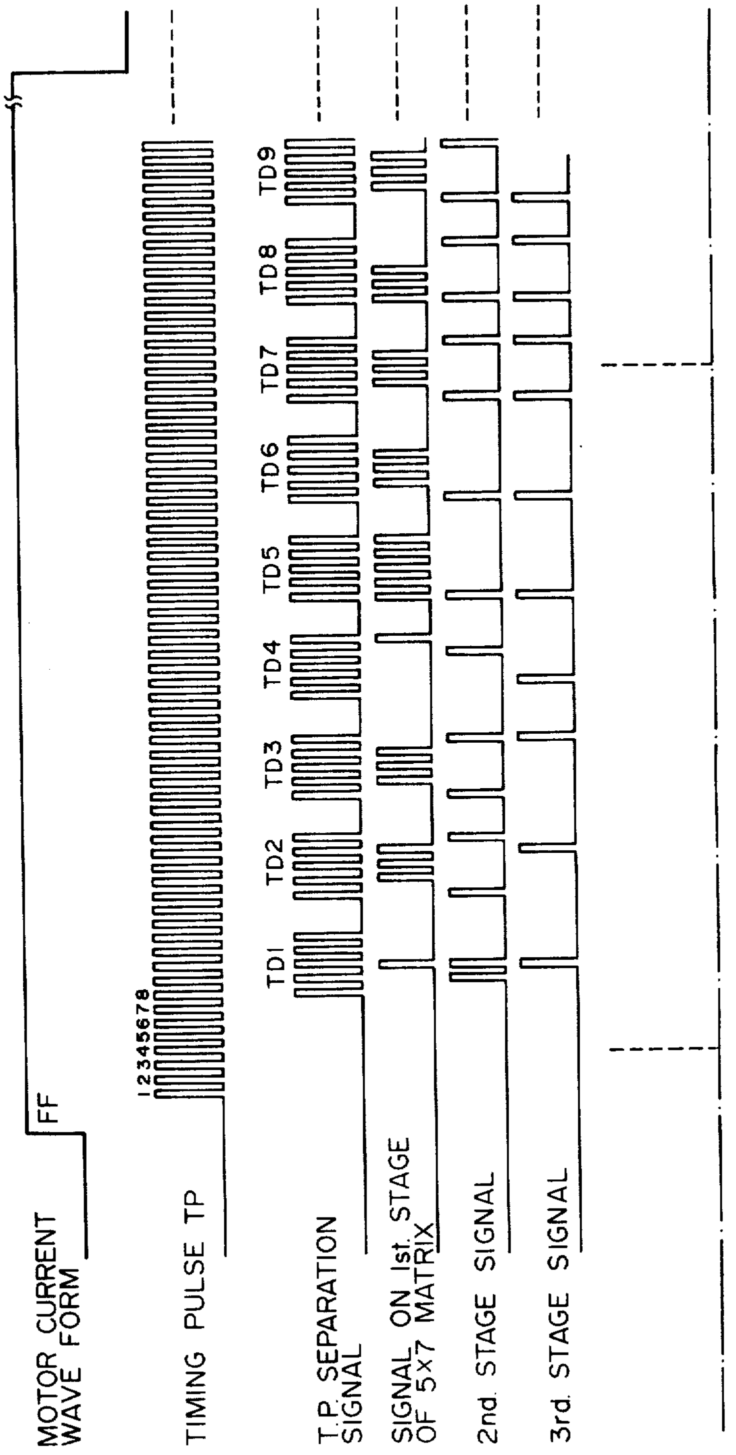

RECORDING APPARATUS

BACKGROUND OF THE INVENTION

1. Field of the Invention

The present invention relates to a serial recording apparatus, and more particularly to the method of controlling the position and speed of an ink jet head for use in such apparatus.

2. Description of the Prior Art

There is already known the serial ink jet recording apparatus utilizing linear motor as disclosed in the U.S. Pat. No. 4,012,676, but such known apparatus is not provided with means for the detection of position and speed of the carriage as well as of the initial or home position of said carriage by means of a single graduation plate.

SUMMARY OF THE INVENTION

The object of the present invention is to provide a recording apparatus which can be realized in a compact, thin and simple structure by providing a non-magnetic graduation plate in a vertical position.

Another object of the present invention is to provide an extremely quiet recording apparatus by the absence of rotary motor or associated gears, links, racks, etc. in the carriage drive and of ratchets, plungers, etc. in the paper advancement, wherein the use of the vertical graduation plate avoids the accumulation of dirts and paper dusts and reduces the resistance in the displacement of carriage due to decreased bend in comparison with the case of horizontal graduation plate.

Still another object of the present invention is to provide a recording apparatus allowing easy and inexpensive manufacture wherein the carriage supports a sub-tank and a printed circuit board for mounting electrical components.

Still another object of the present invention is to provide a recording apparatus featured in free displacement of the carriage by the use of a flexible cable and in a simplified structure wherein said flexible cable is fixed together with the ink supply tube to the sub-tank on the carriage.

DESCRIPTION OF THE PREFERRED EMBODIMENT

Figure 1:
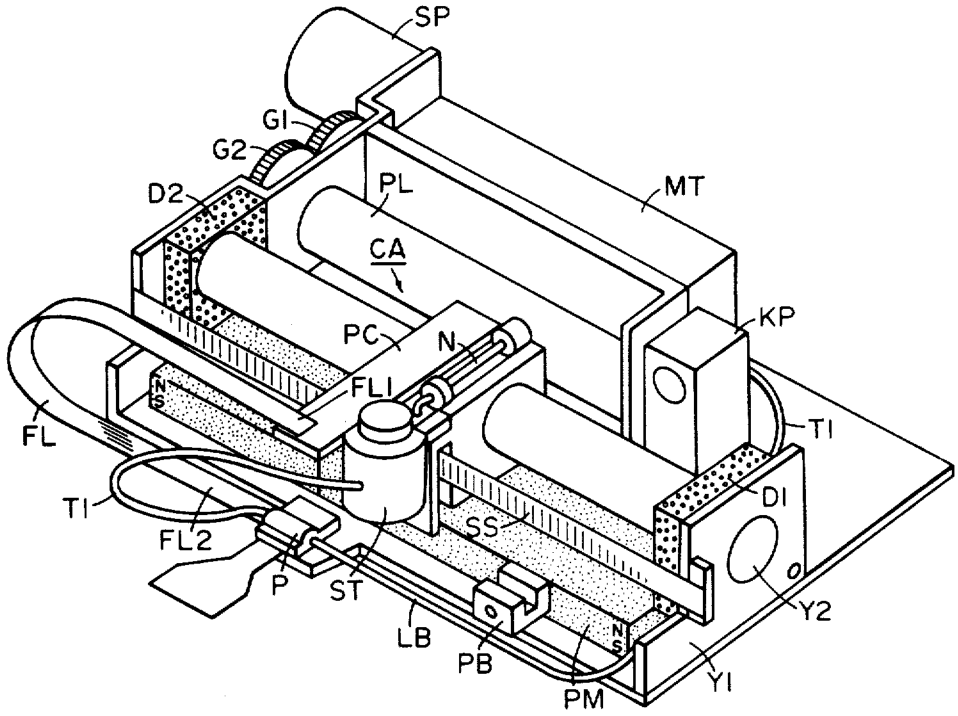
FIG. 1 is a perspective view of an embodiment of the present invention.
Figure 2:
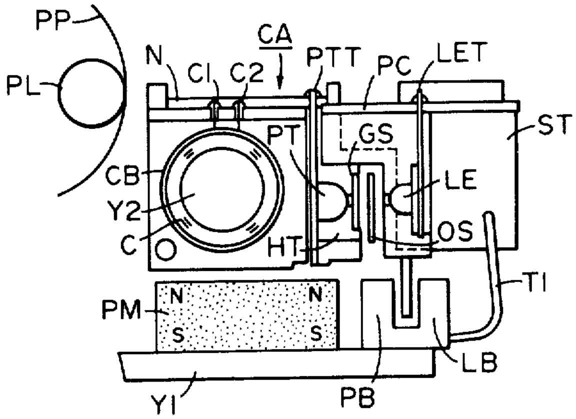
FIG. 2 is a cross-sectional view thereof.
Figures 3A, 3B:
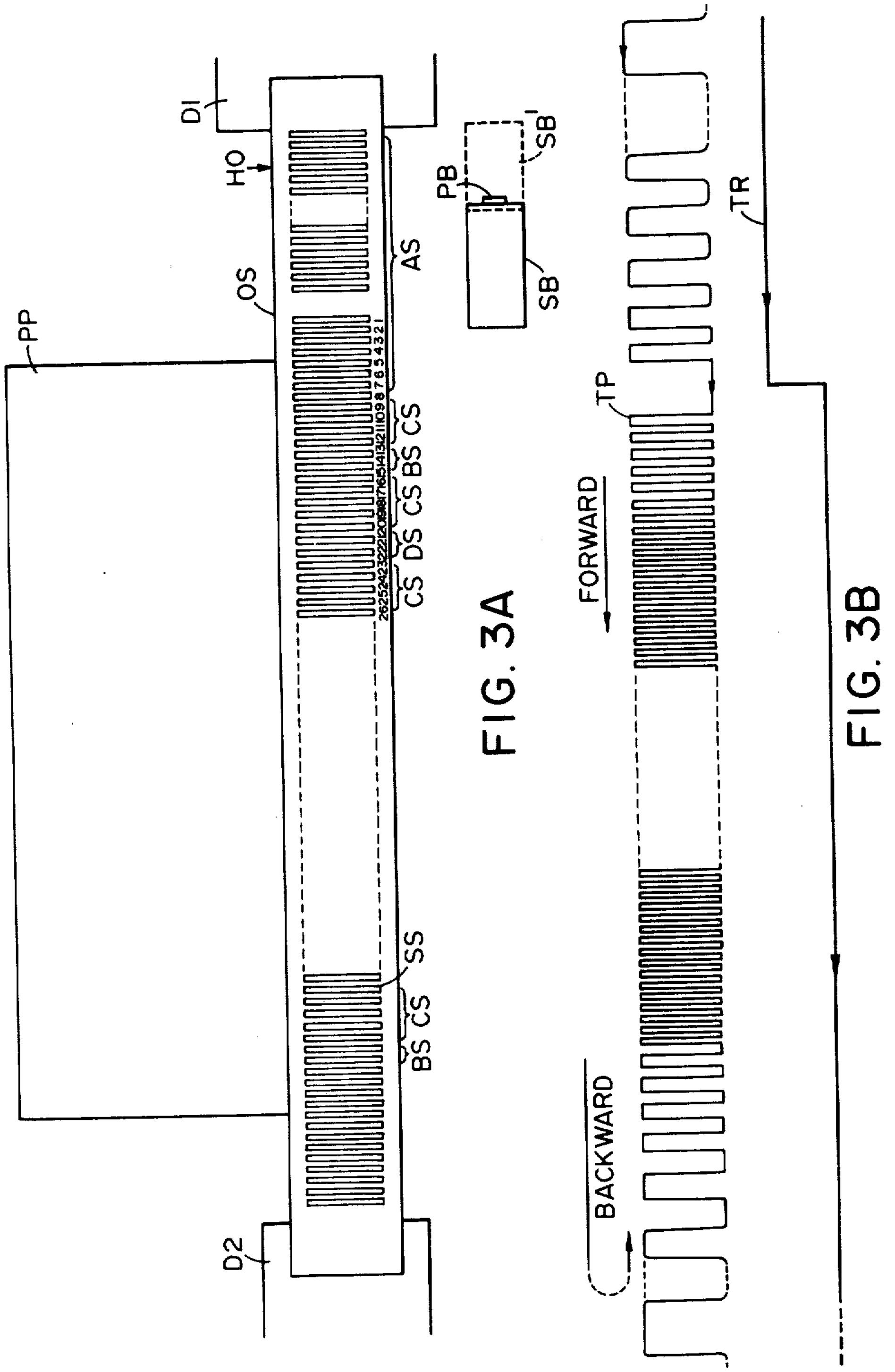
FIGS. 3A and 3B are magnified views of the graduation plate.

At first reference is made to FIGS. 1 and 2 showing a recording apparatus embodying the present invention, wherein a carriage CA provided with a recording head, for example an ink jet nozzle N is driven by a linear motor. The linear motor is provided with a closed magnetic circuit composed of a permanent magnet PM, a magnetic plate Y1 and a magnetic guide member Y2, and a coil C wound on a coil bobbin CB slidably mounted on the guide member Y2 is energized by an electric current to drive the carriage CA integral with said coil bobbin CB according to the Flemming's left-hand rule. The reciprocating motion of the carriage CA on the guide member Y2 is achieved by inverting the direction of the current supplied to the coil C. A graduation plate, for example a non-magnetic optical slit plate OS, is fixed, in a vertical position and together with the guide member Y2, to the magnetic plate Y1. The carriage CA is provided thereon with a printed circuit board PC for connecting the coil bobbin CB for said coil C, the ink jet nozzle N, a sub-tank ST for ink supply to said ink jet nozzle N, an emitter element such as a light-emitting diode LE, a receptor element such as a phototransistor PT and a flexible cable FL, and a shield board SB for intercepting a phototransistor PB and a light-emitting diode LB provided at the home position is provided integral with said printed circuit board. On said board PC connected mechanically and electrically are the terminals C1, C2 of the coil C, unrepresented terminals of a piezoelectric element for driving the ink jet nozzle N, terminals LET of the light-emitting diode LE and terminals PTT of the phototransistor PT. At an end of said printed circuit board PC there is connected an end FL1 of the flexible cable FL, of which the other end FL2 is fixed together with the ink supply tube T1 by means of a fixing plate P. Said ink supply tube T1 is guided to the rear in an air gap magnetically required between the permanent magnet PM and the magnetic plate Y1 and is connected at the rear end to a main tank MT for supplying ink to said sub-tank ST. The optical slit plate OS is positioned between the light-emitting diode LE and the phototransistor PT and perpendicularly to the ink jet nozzle N, thereby saving the space required for said slit plate. Thus, along with the displacement of the carriage CA, the infrared light emitted by the light-emitting diode LE is received through the slits SS of the optical slit plate OS and a receiving slit QS of the same dimension provided on the phototransistor PT to cause on-off operations thereof, thereby generating timing pulses TP as shown in FIG. 3B, which are utilized for detecting the speed and position of the carriage CA in scanning motion and controlling the speed thereof, and the function of the ink jet nozzle and paper feed stepping motor SP. Also the shield board SB displaced together with the carriage CA causes the on-off function of the phototransistor PT at the home position, thereby indicating the presence or absence of the carriage at the home position. The characters in a print row are composed of dot matrices. In the printing operation, in response to a print instruction signal the carriage CA initiates the scanning motion, and, under the positional detection by said timing pulses TP, the piezoelectric element of the ink jet nozzle is energized at determined positions to cause emission of the ink droplet, thereby printing a dot line on the recording paper PP shown in FIG. 3A. Upon completion of the printing of a dot line, the paper feed stepping motor SP is rotated to advance the paper by a dot pitch, and the carriage CA is simultaneously returned to the home position. The arrival of the carriage at the home position is confirmed by the phototransistor PB. The paper feeding is achieved by transmitting the rotation of said stepping motor SP through a motor shaft gear (not shown), a gear G1 and a final gear G2 which is fixed on the shaft of the platen PL, thus advancing the paper by a determined amount in the vertical direction. The above explained procedure is repeated until the completion of printing of a determined number (for example 7) of dot lines, whereupon the platen PL is rotated by said stepping motor SP by an amount corresponding to the space between the print rows, thereby completing the printing of a print row. After the completion of the printing operation, the ink jet nozzle is displaced to and stopped at a cap KP, thereby preventing the clogging, drying or meniscus retraction in the ink jet nozzle.

D1 and D2 are dampers made for example of a foamed material and absorb the shock of collision of the carriage CA, thereby preventing the ink leaking and meniscus retraction in the ink jet nozzle. Also the sub-tank ST is so positioned as not to come into direct contact with the members Y1, D1, etc. whereby the sub-tank is relieved almost completely from the shock to avoid the ink foaming therein.

In the apparatus of the present invention, the optical slit plate OS is provided with slits SS as shown in FIG. 3 for achieving position and speed control.

As shown in FIG. 3A, said slits SS are provided over a length exceeding the entire width of the recording paper PP, and the carriage speed is regulated, after the start thereof from the home position HO, until eight slits are counted. The printing of a character in the first digit is initiated at the 8th slit and conducted over five slits from 8th to 12th, then the succeeding two slits of 13th and 14th are left as blank between the adjacent digits, and the printing operation is thereafter continued in the similar manner. AS, CS and BS respectively represent approach slits for identifying the print start position, character slits for printing and blank slits between the characters, all of which also serve for obtaining a constant carriage speed. At a position where the phototransistor PB is turned on after the start of the carriage CA from the home position, the slit plate is provided with a shield portion of a length corresponding to several slits in order to absorb the eventual fluctuation in the position and speed of the carriage. There are prepared two voltages for driving the linear motor, the ordinary one being used in the ordinary print operation while the lower one being used in maintaining the carriage pressed against the right-hand end position. Upon turning on of the power supply, the carriage CA is at first driven in the backward direction (to the right in FIG. 1), and, upon arrival of the carriage CA at the home position which is confirmed by the output signal from the phototransistor PB, the drive voltage is shifted to the lower one to decelerate the carriage, thereby pressing it against the damper D1 and stopping it at the position of said cap KP. If the carriage CA is already at the home position, the drive voltage is immediately switched to the lower one, thus maintaining the recording head in the stand-by state. Also upon completion of the printing of a row, after the carriage is driven backward and the arrival thereof at the home position is confirmed, the drive voltage is similarly switched to the lower one to fix the carriage CA in a state pressed against the damper D1, thereby ensuring the nozzle protection as explained in the foregoing and the nozzle recovery by forced suction.

Figure 4:
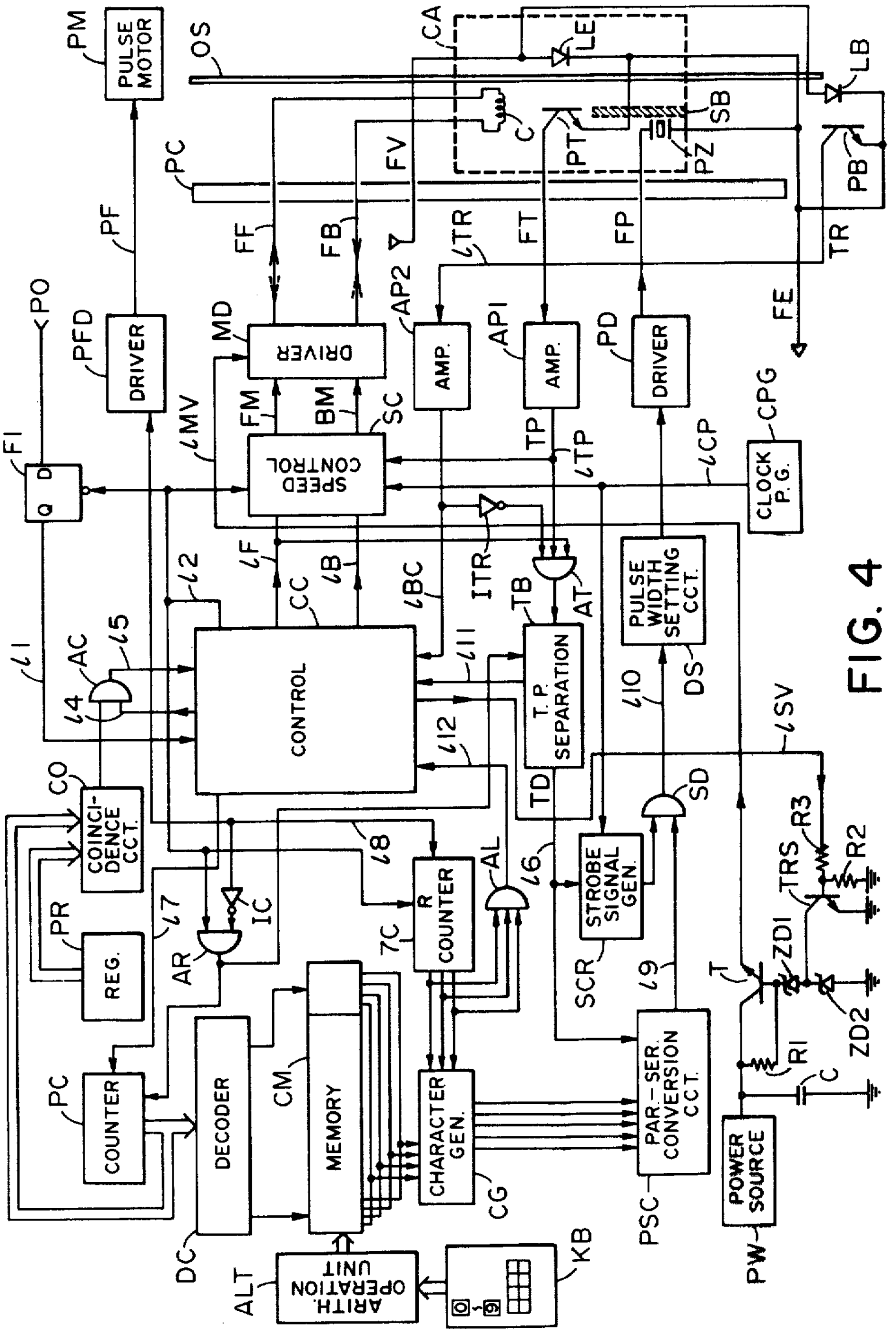
FIG. 4 is a block diagram of an example of the control circuit.

FIG. 4 shows an embodiment of the control circuit for the apparatus of the present invention, wherein the lines FF, FD, FV, FT, FP and FE are integrally formed as a flexible cable FL shown in FIG. 1 to facilitate the displacement of the carriage CA. In this circuit, upon turning on of the power supply, a control unit CC maintains a signal line l2 at the level-0 state to reset a flip-flop F1, a line counter 7C and a speed control unit SC, to clear a print digit counter PC and a timing pulse separating circuit TB through a gate AR and to shift a voltage switching signal line lSV to the level-0 state thereby turning off a transistor TRS and thus supplying the motor with the ordinary voltage whereby the carriage CA is displaced backwards to the home position by the level-0 and level-1 states of the coil drive signal lines lF and lB, respectively.

After the starting of said backward drive, the control unit CC detects, through a signal line lTR, whether the carriage CA is at the home position or not.

In case the carriage CA is not yet at the home position, the backward displacement is continued under speed control to the home position, at which the shield board SS integral with the carriage CA turns off the phototransistor PB, whereby the signal therefrom is transmitted through a signal line lTR, then amplified by an amplifier AP2 and further transmitted through a signal line lBC. In this manner the control unit CC identifies the presence of the carriage CA at the home position.

In response to said signal the control unit CC shifts a signal line lSV from level-0 to level-1 to turn on a transistor TRS, thereby shortcircuiting the voltage applied across a Zenar diode ZD2. Thus the voltage LMV supplied to a motor driver unit MD is switched to a lower voltage, whereby the carriage CA is pressed against the right-hand end, while motor drive signal lines lF and lB are maintained in the level-0 and level-1 states respectively.

Said switching to the lower voltage allows to reduce the heat generation of the coil and the power consumption.

On the other hand, in case the carriage CA is at the home position from the beginning, the phototransistor PB is in the off (level-1) state, whereby the motor drive voltage is immediately switched to the lower voltage to press the carriage CA against the foamed member D1 at the right-hand end.

Figure 5A:
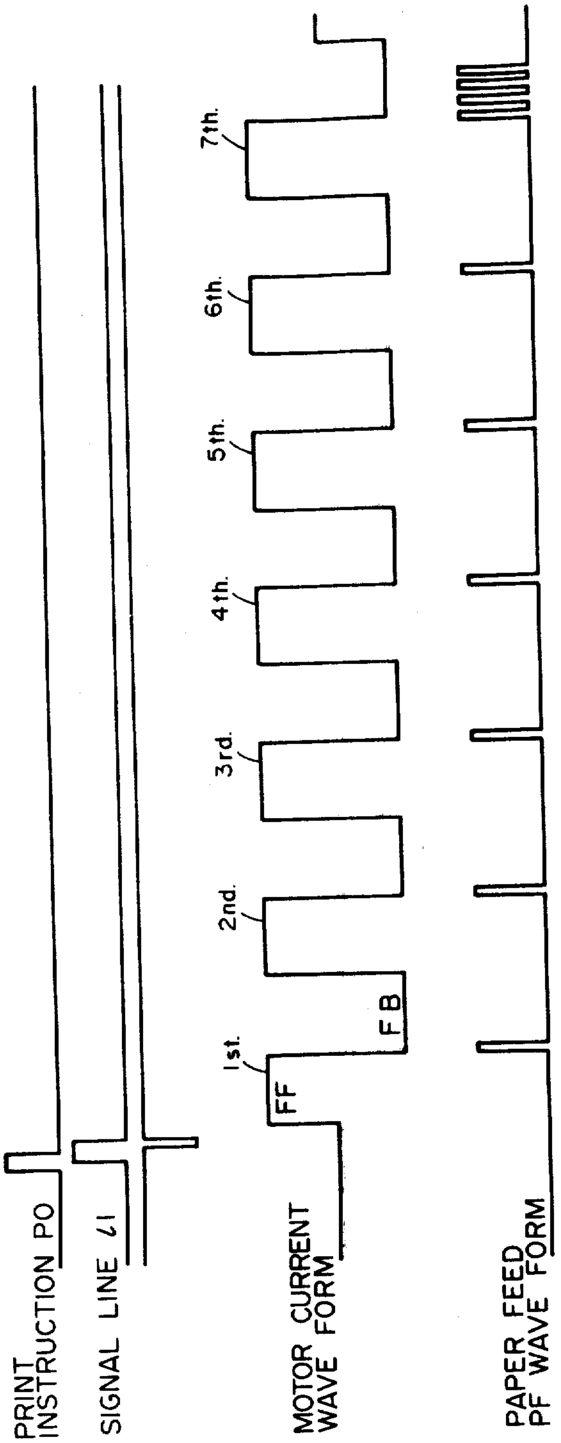
FIGS. 5A and 5B are waveform charts showing the printing function thereof.

The information to be printed is entered from a keyboard KB through an arithmetic operation unit ALT and stored in a print character memory CM. In response to a print instruction signal PO shown in FIG. 5A the flip-flop F1 is set to release signal through the set output signal line l1, whereby the control unit CC is shifted to the print operation mode and maintains the signal line l2 at level-0 for a determined period to reset the flip-flop F1, line counter 7C and speed control unit SC, to clear the print digit counter PC and timing pulse separating circuit TB through the gate AR and to shift the signal line lSV from level-1 to level-0 thereby turning off the transistor TRS and changing the motor drive voltage to the normal value. Then a signal line l4 is shifted to level-1 to open a gate AC, and the output signal from a coincidence circuit CC comparing the contents of the print digit counter PC and a print digit storage register (hereinafter called print digit register) PR is sensed through said gate AC and a signal line l5. In the absence of coincidence the signal lines lF and lB are respectively shifted to the level-1 and level-0 to energize the coil C through the motor driver MD thereby displacing the carriage CA in the forward direction and thus conducting the printing operation.

For example, in case the contents of said print digit counter PC and print digit register PR are respectively "0" and "n", the coincidence circuit releases a signal indicating the absence of coincidence, in response to which the control unit CC effects the above-explained drive operation.

Along with the forward displacement of the carriage CA, the shield board SB integral therewith is displaced between the light-emitting diode LB and the phototransistor PB and finally extracted therefrom, whereby said phototransistor PB is turned on to release a level-0 signal which is transmitted through the signal line lBC and introduced to a gate AT through an inverter ITR.

Also along with said displacement of the carriage CA, the detectors LE, PT provided thereon are displaced along the optical slit plate OS to release slit detection signals, which are transmitted through a signal line FT and amplified by an amplifier AP1 to obtain timing pulses TP on a signal line lTP.

Said gate AT is receiving a level-1 signal through the signal line lF but another input signal to be received through the inverter ITR is shifted to the level-1 when the shield board SB integral with the carriage CA is displaced from the light-emitting diode LB and the phototransistor PB to open said gate thereby transmitting the timing pulses TP to the timing pulse separating circuit TB.

Figure 5B:
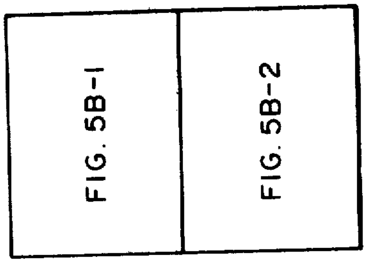
Figures 2, 5B:
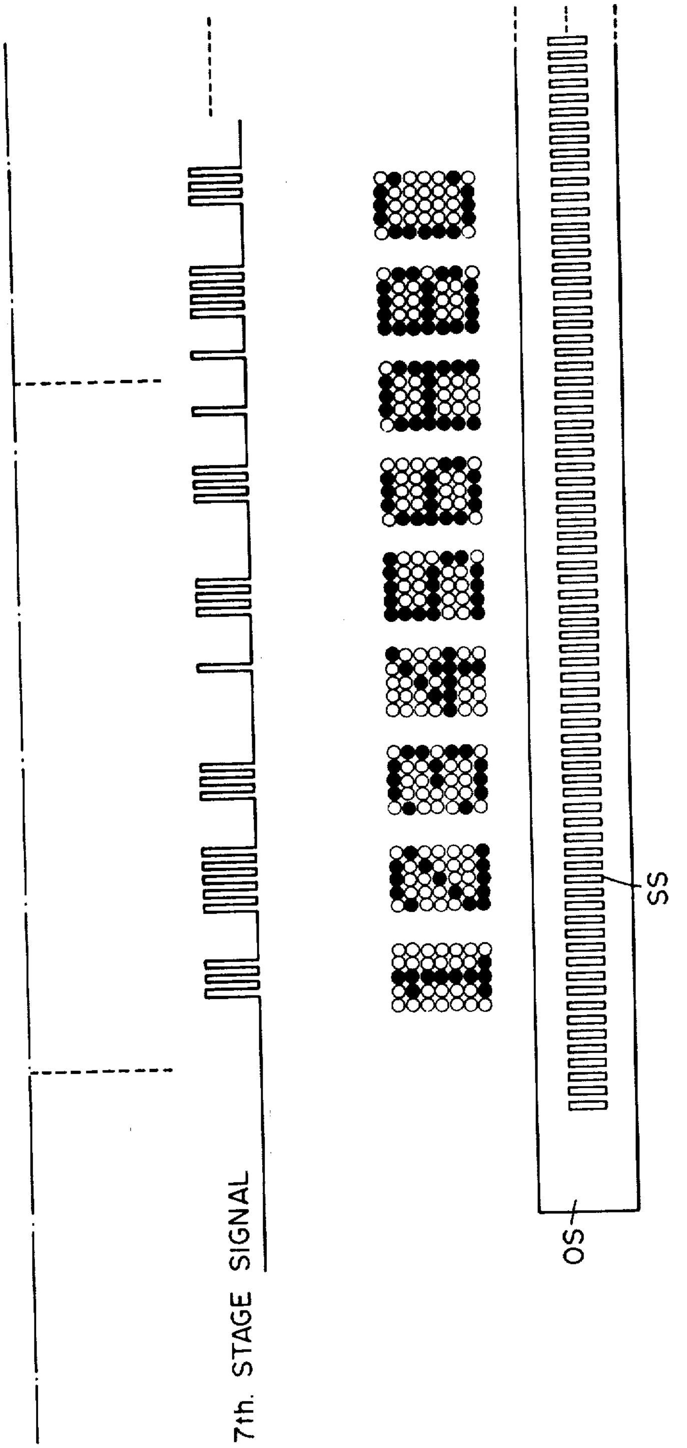

In said circuit the timing pulses TP are separated into 5-pulse signals TD1–TDn as shown in FIG. 5B each for the printing of a digit, and introduced through a signal line l6 into a parallel-serial converter PSC and a strobe signal generator SCR.

The number of digits to be printed in a row is already stored in the print digit register PR, while the digit to be printed is counted by the print digit counter PC, of which output signal is supplied to a decoder DC for selecting the content of the print character memory CM.

Figure 6A:
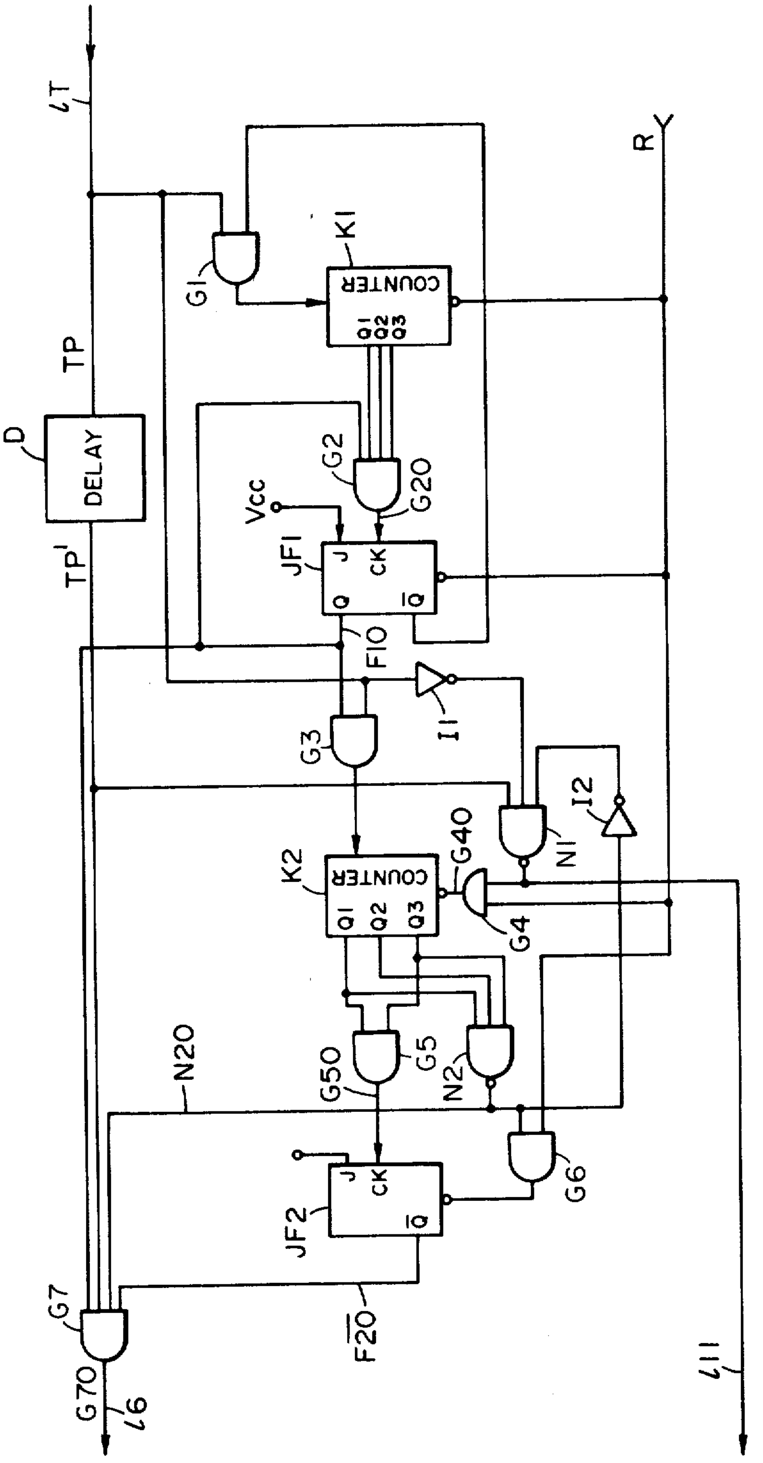
FIG. 6A is a diagram of a part of said circuit.
Figure 6B:
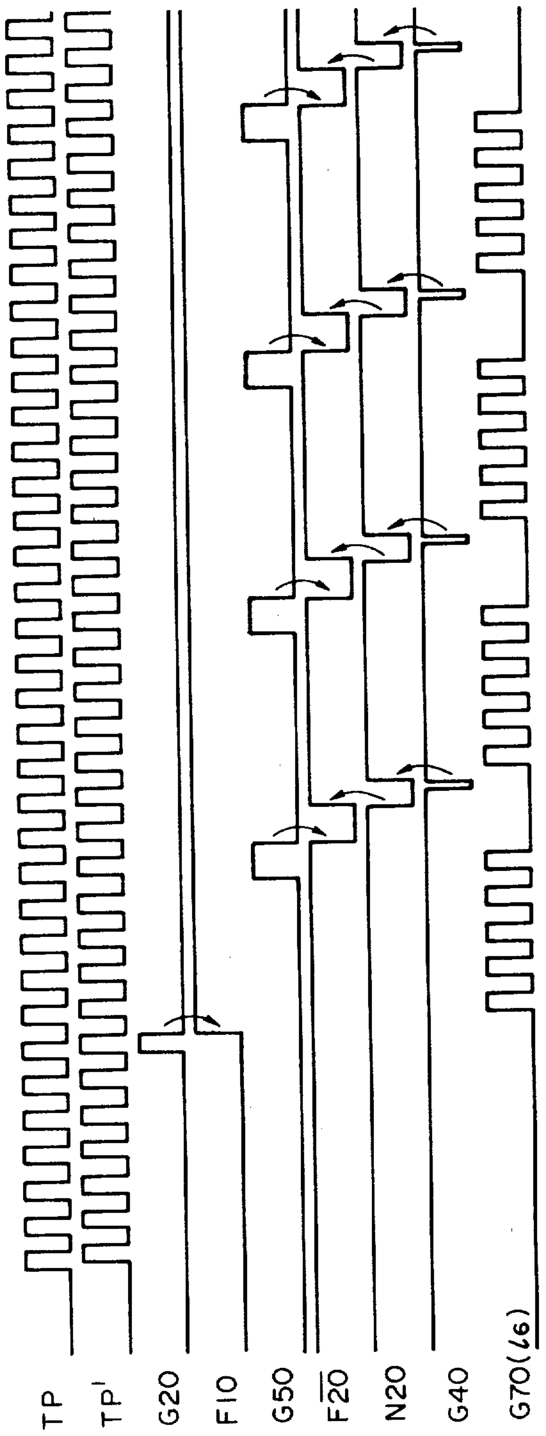
FIG. 6B is a waveform chart showing the function thereof.

In response to thus selected content and under the control by the line counter 7C, a character generator CG releases 5-bit print data signals for a 5×7 dot matrix. Said 5-bit print data signals are supplied to the parallel-serial converter PSC and serially released to a gate SD through a signal line l9 in synchronization with 5-pulse signals TD supplied from the timing pulse separating circuit TB. Said print data signals are further supplied to a signal line l10 through a gate SD in response to the strobe signals supplied from said strobe signal generator SCR in synchronization with the 5-bit signal TD, and activates a driver PD through a pulse width setting circuit DS to drive the piezoelectric element, thereby achieving the printing of 5 horizontal dots in a digit by the emissions of ink droplets in synchronization with the output signals from said parallel-serial converter PSC. The timing pulse separating circuit TB shown in FIG. 4 can be composed, as shown in FIG. 6A, of a delay circuit D, counters K1, K2, JK flip-flops JF1, JF2, AND gates G1–G7, NAND gates N1, N2, and inverters I1, I2 to generate the 5-bit signals TD1–TDn on the output line l6 as shown in the timing chart of FIG. 6B.

Upon completion of the printing of 5 dots in the first line of seven lines constituting a 5×7 dot matrix in the first digit in a print row, the control unit CC senses said completion through a signal line l11 and releases a signal through a signal line l7 to step advance the print digit counter PC. Thereafter the gate AC is opened by the signal line l4, and the output signal from the coincidence circuit CC comparing the contents of the print digit register PR and of the print digit counter PC is supplied through the line l5. In the absence of coincidence the control unit CC performs, in response to the 5-bit signals TD2 from the timing pulse separating circuit TB, the printing of a character selected from the print character memory corresponding to the thus advanced content of the print digit counter PC.

The above-mentioned steps of step advancement of the print digit counter, memory readout and signal entry into the parallel-serial converter are achieved sufficiently prior to the succeeding 5-pulse signals, since the frequency of the clock pulses of the circuit is sufficiently larger than that of the timing pulses. In this manner conducted is the printing of 5-dot digits of the first line in the first print row, in response to the signals TD3, TD4, . . . , TDn. When the coincidence of the contents of the print digit counter PC and the print digit register PR is identified by the coincidence circuit CC in the course of printing of first line and transmitted through the gate AC opened by the line l4 and further through the line l5, the control unit CC maintains a signal line l8 for a determined period to drive a driver PFD to advance the paper, clears the print digit counter PC and timing pulse separating circuit TB through the gate AR and step advances the line counter 7C. At this point the control unit CC identifies that the printing of 7th line is not completed from the level-0 state of a signal line l12 indicating the logic product of the outputs from the line counter 7C.

Thus the control unit CC shifts the signal lines lF and lB respectively to level-0 and level-1 to drive the carriage in the backward direction to the home position under speed control, whereby the shield board SB integral with the carriage CA intercepts the light from the light-emitting diode LB to turn off the phototransistor PB, of which output signal is supplied through the line lTR, amplifier AP2 and lBC. In this manner the control unit CC identifies the arrival of the carriage at the home position and shifts the signal line lB to level-0 thereby terminating the backward displacement of the carriage CA.

During said backward displacement of the carriage the gate AF is closed by the level-0 state of the line lF to forbid the entry of timing pulses TP into the timing pulse separating circuit TB, so that the printing operation is not conducted during such backward displacement.

The control unit CC proceeds to the printing of the succeeding line indicated by the line counter 7C, identifying that the printing of the 7th line in 5×7 dot matrices is not completed through the state of the line l12 as explained in the foregoing.

Now the line counter 7C is step advanced from "0" to "1" to indicate the 2nd line in the character generator, and the control unit CC shifts the signal lines lF and lB respectively to level-1 and level-0 to activate the driver MD and to enter the gate AT.

Along with the forward displacement of the carriage CA the shield board SB integral therewith is extracted from the space between the light-emitting diode LB and the photo-transistor PB, whereby the output signal thereof is shifted to level-0 and supplied, through the line lTR, amplifier AP2 and line lBC, to the inverter ITR to open the gate AT. Thus the timing pulses TP obtained from the detectors LE, PT along with the displacement of the carriage CA and amplified through the amplifier AP1 and line lTP are transmitted through said gate AT to the timing pulse separating circuit TB, which separates said timing pulses into 5-pulse signals TD2–TDn.

Then, as explained in the foregoing, a character of the first digit is selected from the print character memory CM by the instruction supplied from the print digit counter PC through the decoder DC, and the character generator CG releases the data of the second line of the 5×7 dot matrix in response to the step advanced-content of the line counter 7C. Said data are serially released from the parallel-serial converter PSC in response to the 5-pulse signals TD from the timing pulse separating circuit and supplied to the pulse width setting circuit DS through the gate SD in response to the strobe signals supplied from the strobe signal generator SCR to drive the drive for determined periods thereby releasing the signals of the second line in the 5×7 dot matrix of the character of first digit and thus achieving the corresponding print.

Thereafter the printing of the second line of the 5×7 dot matrices is continued for the determined number of digits in the same manner as in the printing of the first line. When the completion of the printing of the second line is identified by the coincidence circuit CC in the aforementioned manner, the control unit CC advances the paper through the signal line l8, clears the print digit counter PC and the timing pulse separating circuit TB and step advances the line counter 7C. Then the control unit CC identifies, in the forementioned manner from the level-0 state of the signal line l12 from the gate AL, that the printing of the seventh line of the 5×7 dot matrices is not completed, and shifts the signal lines lF and lB respectively to level-0 and level-1 to drive the carriage CA in the backward direction under speed control. When the shield board SB integral with said carriage CA intercepts the light from the light-emitting diode LEB, the signal line lBC from the phototransistor PTB is shifted from level-0 to level-1, whereby the control unit CC detects the arrival of the carriage CA at the home position and shift the signal line lB to level-0 to terminate the backward displacement of the carriage CA. Subsequently the printing of the succeeding line indicated by the step advanced line counter 7C is conducted in the same manner.

Upon completion of the printing up to the seventh line in this manner, the control line CC advances the paper by a dot line, clears the print digit counter PC and timing pulse separating circuit TB and step advances the line counter 7C. At this point the control unit CC identifies the completion of the printing of the seventh line of 5×7 dot matrices from the level-1 state of the output signal line l12 from the gate AL, and shifts the signal lines lF and lB respectively to level-0 and level-1 in the aforementioned manner to displace the carriage CA in the opposite direction to the home position until the output signal of the phototransistor PB on the line signal line lBC is shifted from level-0 to level-1. In the meantime the control unit CC activates the driver PFD through the signal line l8 to advance the paper three times to complete the printing of a print row. Upon arrival of the carriage CA at the home position, the control unit CC identifies the presence of absence of succeeding instruction signals by the state of the output signal line l1 from the flip-flop F1. In case the line l1 is in the level-1 state indicating the presence of the print instruction signals for the succeeding row, the control unit CC, thus identifying that the printing is to be continued, shifts the signal line lB to level-0 to terminate the motor drive, maintains the signal line l2 for a determined period as in the printing of the preceding line to reset the flip-flop F1, line counter 7C and speed control unit SC and to clear the print digit counter PC and timing pulse separating circuit TB through the gate AR. Then the coincidence circuit CC compares the contents of the print digit counter PC and of the print digit register PR and provides the result of said comparison through the gate AC opened by the level-1 state of the line l4, and the printing is conducted in the same manner as explained in the foregoing. On the other hand, in case of the level-0 state of the line l1 from the flip-flop F1 indicating the absence of the succeeding print instruction signal, the control unit CC shifts the signal line lSV to turn on the transistor TRS thereby selecting the lower motor drive voltage while maintaining the signal lines lF and lB respectively at level-0 and level-1, whereby the carriage CA is pressed to the right-end position and secured therein.

Figure 7:
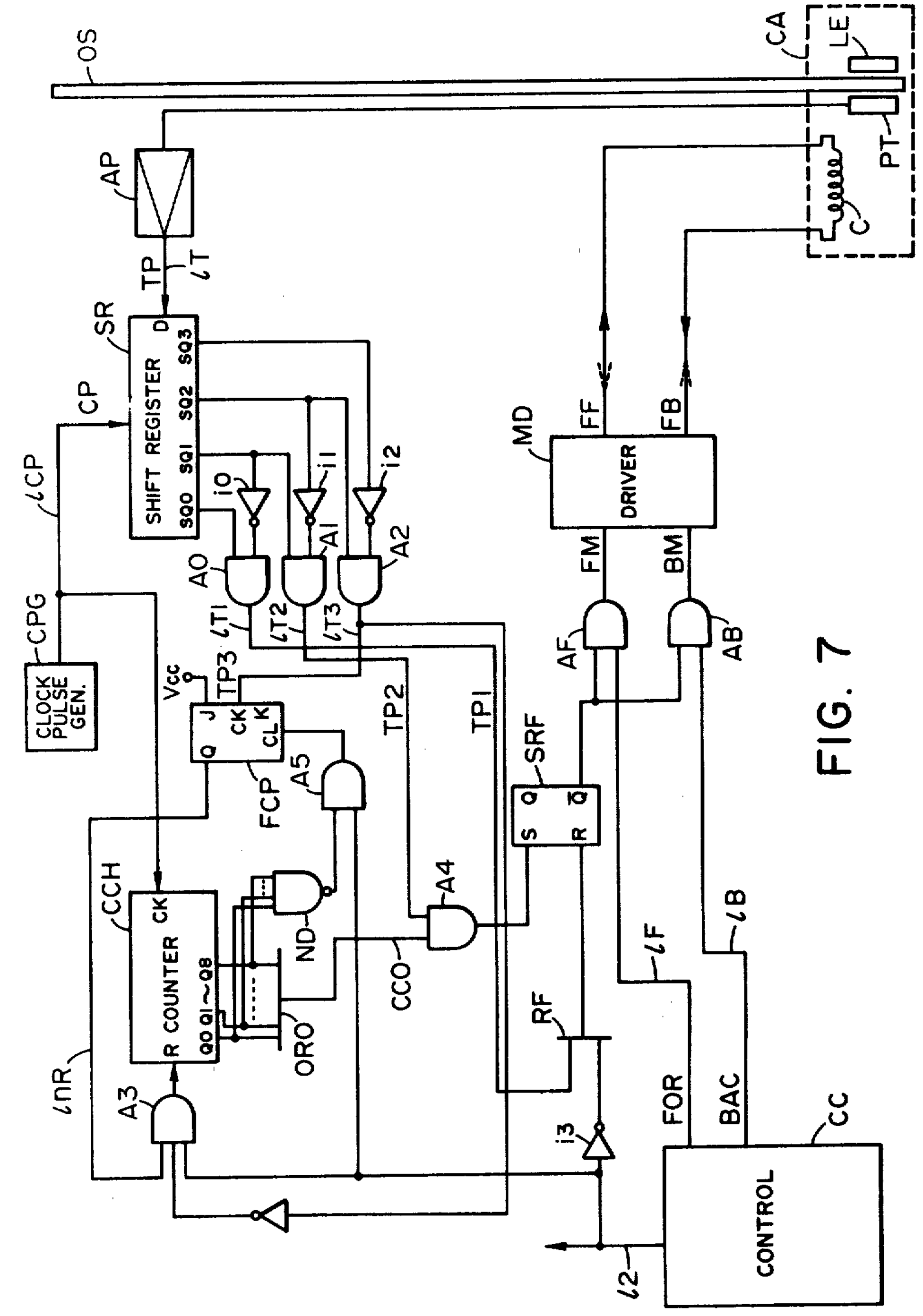
FIG. 7 is a block diagram showing a method of speed control.
Figure 8:
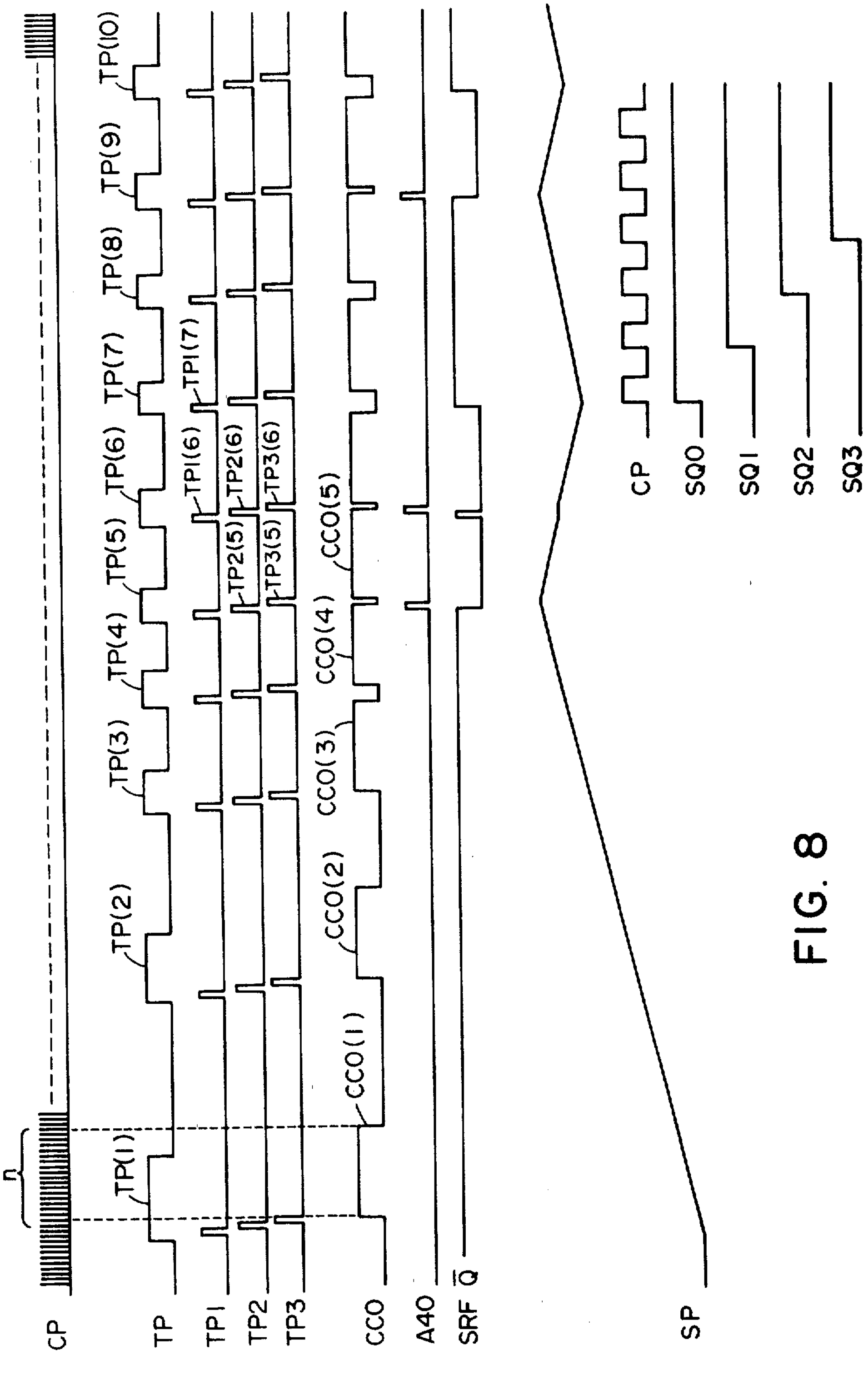
FIG. 8 is a waveform chart showing the function thereof.

The speed control unit SC shown in FIG. 4 for the speed control of the carriage CA is detailedly shown in FIG. 7, with a corresponding timing chart in FIG. 8, wherein the signals optically detected by the light-emitting diode LE and the phototransistor PT along with the displacement of the carriage CA on the optical slit place OS are supplied, through the amplifier AP1, to the signal line lTP as the timing pulses TP, upon receipt of which a 4-bit shift register SR releases in succession set signals to output ports Q0, Q1, Q2 and Q3 thereof in response to clock pulses CP supplied from a clock pulse generator CPG. An AND gate A0 releases on a signal line lT1 a signal TP1 indicating the logic product of the signal Q0 and the signal Q1 inverted by an inverter i0, while an AND gate A1 releases on a signal line lT2 a signal TP2 indicating the logic product of the signal Q1 and the signal Q2 inverted by an inverter i1, and a signal TP3 is released on a signal line lT3 in the similar manner indicating the logic product of the signal Q2 and the signal Q3 inverted by an inverter i2, said signals TP1–TP3 being represented in FIG. 8. The signal TP1 supplied through the signal line lT1 resets a flip-flop SRF through an OR gate RF, and the signal TP2 supplied through the signal line lT2 opens an AND gate A4 for the duration of said signal TP2.

Also the signal TP3 supplied through the signal line lT3 sets a flip-flop FCP to supply an output signal to an AND gate A3 thereby resetting a counter CCH through an inverter only during the level-1 state of said signal TP3, said resetting being terminated when the signal TP3 is shifted to level-0 to allow entry of the clock pulses CP from the line lCP into said counter CCH.

Said counter CCH is reset through the gate A3 at the start of printing operation by the level-0 state of the signal line l2 while the flip-flop FCP is reset through the gate A5 to supply a level-0 signal through the signal line lnR to the gate A3 thereby continuing the reset state of said counter CCH. Then in the level-1 state of the signal TP3 the flip-flop FCP is set to shift the signal line lnR to level-1, and the counter CCH initiates the counting operation thereafter when said resetting is terminated by the level-0 state of the signal TP3. Upon completion of said counting operation, all the output ports Q0-Qn are in the level-1 state to provide a level-0 signal through a NAND gate ND to reset the flip-flop FCP whereby the counter CCH is also reset.

Also the flip-flop SRF is reset by said line l2 through an inverter i3 and an OR gate RF to open AND gates AF and AB. The function of the circuit shown in FIG. 7 will be further clarified in the following.

In response to a timing pulse TP(1) there are generated pulse signals TP1, TP2 and TP3 in succession, and in response to said signal TP3 the flip-flop FCP is set whereby the counter CCH initiates the counting of clock pulses CP, releasing output signals to the ports Q0-Qn. During said counting of n pulses, an OR gate ORO supplies, through a signal line CCO, a level-1 signal to the AND gate A4, which also receives, through the signal line lT2, the signal TP2 generated in response to said timing pulse TP. Said timing pulses TP are generated by the displacement of the carriage CA as explained in the foregoing, so that the timing and pulse width of said pulses are related with the carriage speed. Consequently, in response to a timing pulse indicating a low speed state of the carriage such as the timing pulse TP(1) shown in FIG. 8, the signal TP2 is not released to maintain the gate A4 closed during the counting operation of the counter CCH, whereby the flip-flop SRF remains in the reset state achieved through the OR gate RF in response to the signal TP1 released prior to said signal TP2. Thus the carriage CA integral with the coil C continues displacement since the gates AF, AB are not affected in this state.

Also in response to the signals TP(2), TP(3) and TP(4) the drive function of the motor coil C is not changed since the AND gate A4 does not release the logic product signal of the counter output signal CCO and the signal TP2, but the interval of the timing pulses becomes gradually smaller because the carriage speed is gradually increased by the continued drive. Thus, in response to the timing pulse TP(5), the gate A4 releases the logic product signal of the output signal CCO(4) supplied from the counter CCH through the gate ORO and of the signal TP2(5) to set the flip-flop SRF through a signal line A40.

Upon said setting the output $\bar{Q}$ thereof is shifted from level-1 to level-0 to close the gates AF and AB, thus deactivating the driver MD and terminating the drive of the coil C. Even after said termination the carriage CA continues inertial displacement, however with a gradually decreasing speed due to the friction. At the succeeding signal TP3(5) the counter CCH is reset through the inverter and starts the counting operation again by the setting of the flip-flop FCP at the end of said signal TP3(5). Then in response to the signal TP1(6) corresponding to the succeeding timing pulse TP(6), the flip-flop SRF is reset through the gate RF to shift the output $\bar{Q}$ to level-1 whereby the gates AF, AB are opened to restart the coil drive.

Although the carriage speed is decreased in the period from the signal TP2(5) to the signal TP1(6) due to thus interrupted coil drive, the speed is still high at the signal TP(6) shown in FIG. 8, so that the gate A4 transmits the logic product signal of the output signal CCO(5) from the counter CCH and the signal TP2(6) in a similar manner as in the case of the timing pulse TP(5) to again set the flip-flop SRF, whereby the gates AF, AB are closed to interrupt the coil drive until the arrival of the signal TP1(7) corresponding to the succeeding timing pulse TP(7). At this point the counter CCH is reset by the signal $\overline{TP3(6)}$ and starts the counting operation again when the flip-flop FCP is set at the end of the signal TP3(6).

Subsequently the flip-flop SRF is reset through the gate RF by the signal TP1(7) corresponding to the succeeding timing pulse TP(7), whereby the gates AF, AB are opened to restart the coil drive.

Thereafter the coil drive is controlled in the similar manner by the logic product of the signals TP2 and the counter output signals CCO, and is continued in response to the timing pulses TP(7) and TP(8) but is interrupted in response to TP(9) as in the case of timing pulses TP(5) and TP(6), thus achieving the speed control of the carriage CA based on the count n of the clock pulses CP by the counter CCH.

As explained in the foregoing, the optical slit plate OS employed in the recording apparatus of the present invention is provided with slits SS over a length not limited to the width of the recording paper P but covering the entire range of reciprocating motion of the carriage CA, whereby the speed control therefor is achieved during the entire period of the reciprocating motion by means of the timing signals TP indicating the speed and print position and of the signal TR indicating the home position, thus ensuring stable printing operation. Also the control in returning movement of the home position is achieved by said signal TR without complicated control process such as the comparison of light transmission times on the slit plate, and is easily adaptable to the case where the number of digits to be printed is variable.

In the embodiment shown in FIG 7, the displacing speed in both directions is controlled by a single count number of the counter CCH. Such structure is useful in case of printing in both directions but is detrimental to the increase of the overall printing speed in case the printing operation is conducted only in the forward displacement as in the present embodiment. In such one-directional printing, the backward displacement of the carriage should preferably be made at a high speed without speed control, but the high-speed collision of the carriage at the end position in such ink jet serial recording apparatus may lead to various troubles such as ink leaking or retraction of ink meniscus. For this reason it is desirable to effect the backward displacement at a speed higher than in the forward displacement but still under speed control.

Figure 9:
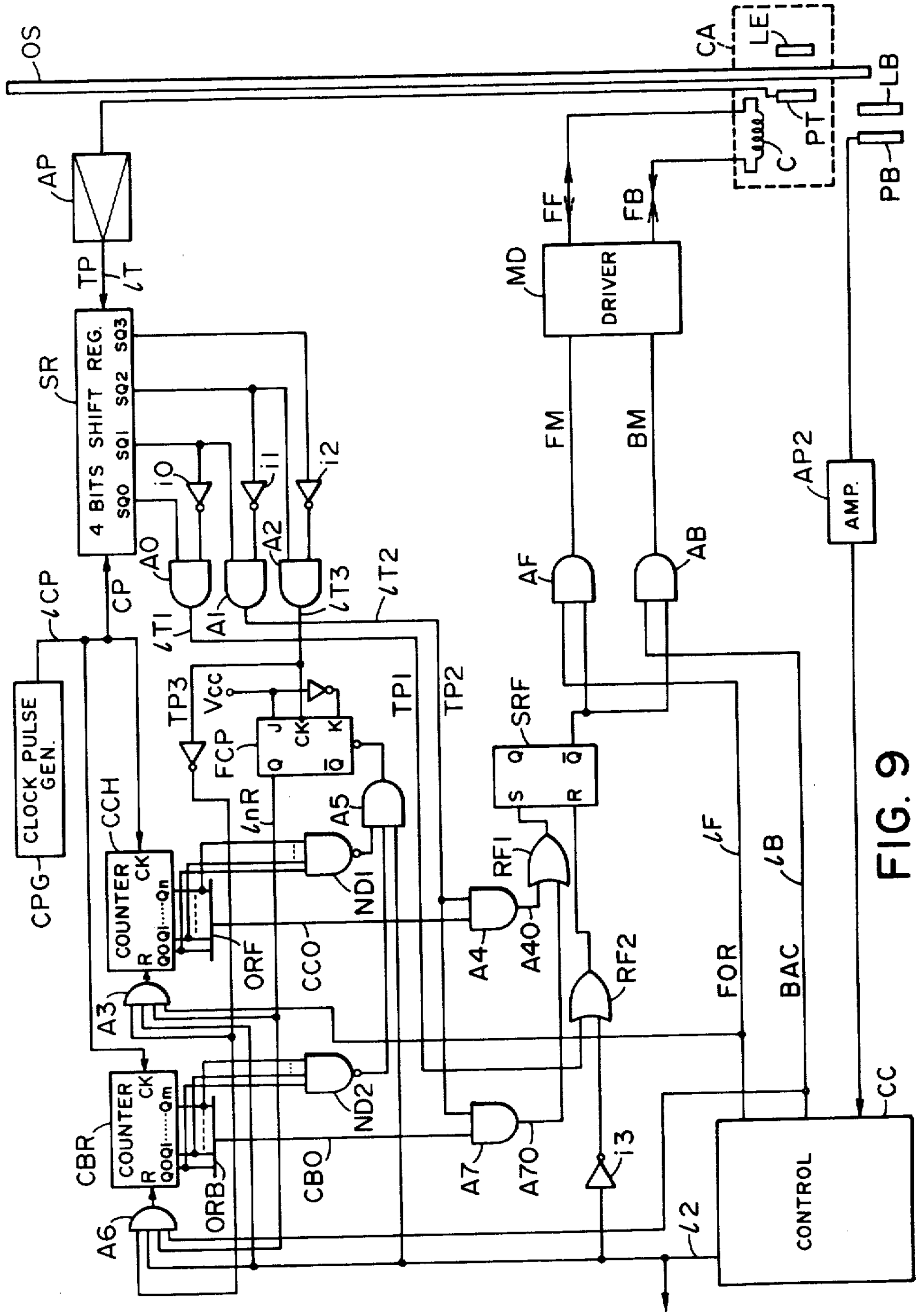
FIG. 9 is a block diagram showing another embodiment of the present invention.
Figure 10:
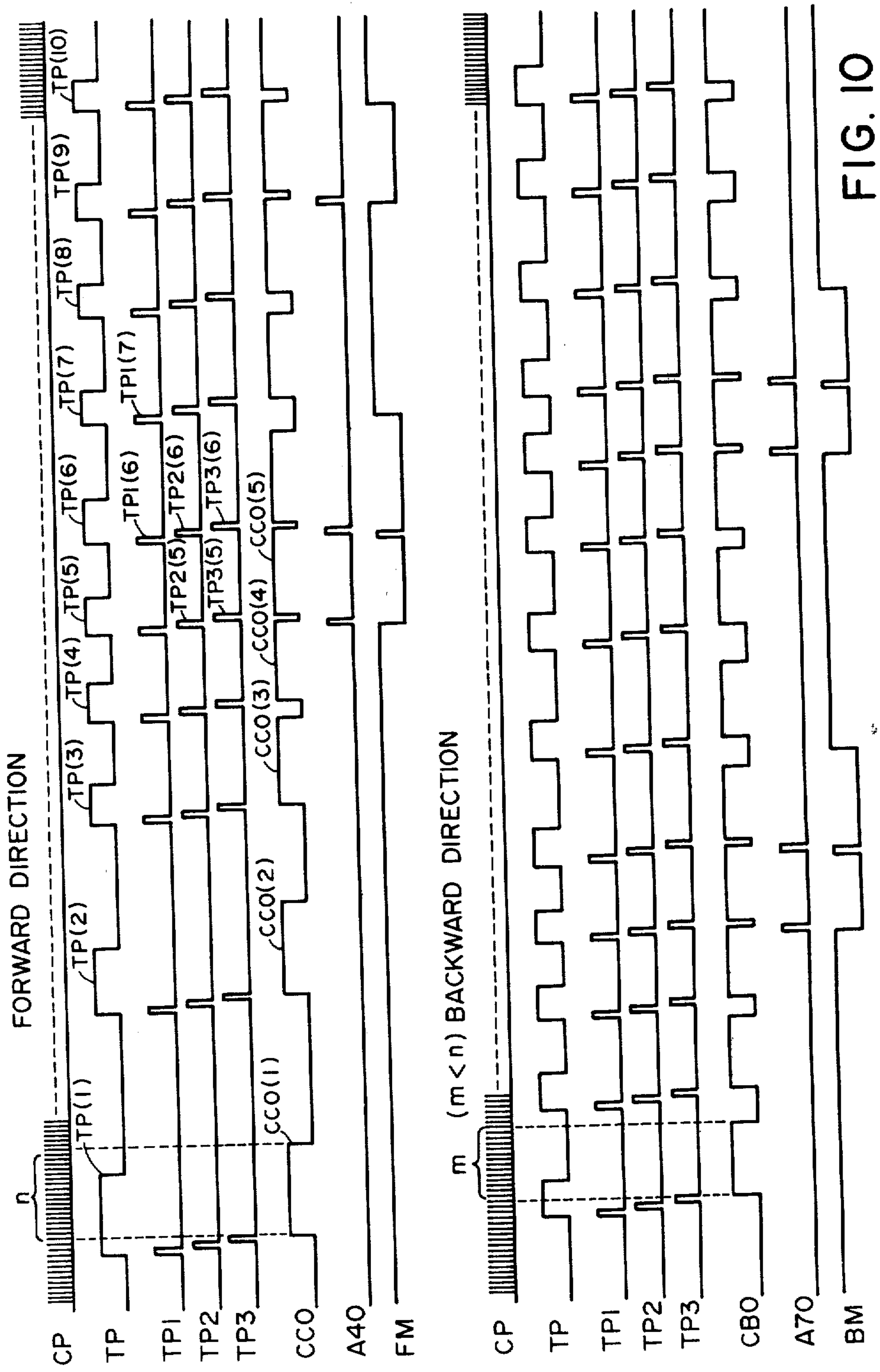
FIG. 10 is a waveform chart showing the function thereof.

FIG. 9 shows an example of the circuit having different standard speeds for the forward and backward displacement, of which function is shown in the timing chart of FIG. 10.

In the circuit shown in FIG. 9, the signals optically detected by the light-emitting diode LE and the phototransistor PT along with the displacement of the carriage CA on the optical slit plate OS are supplied, through the amplifier AP1, to the signal line lTP, as the timing pulses TP, upon receipt of which a 4-bit shift register SR releases in succession set signal to the output ports Q0, Q1, Q2 and Q3 thereof in response to clock pulses CP supplied from the clock pulse generator CPG. An AND gate A0 releases on a signal line lT1 a signal TP1 indicating the logic product of the signal Q0 and the signal Q1 inverted by an inverter i0, while an AND gate A1 releases on a signal line lT2 a signal TP2 indicating the logic product of the signal Q1 and the signal Q2 inverted by an inverter i1, and a signal TP 3 is released on a signal line lT3 in the similar manner indicating the logic product of the signal Q2 and the signal Q3 inverted by an inverter iw. The signal TP1 supplied to the signal line lT1 resets a flip-flop SRF through an OR gate RF2, and the signal TP2 supplied through the signal line lT2 opens an AND gate A4 for the duration of said signal TP2.

Also the signal TP3 supplied through the signal line lT3 sets a flip-flop FCP to supply an output signal to AND gates A3, A6 thereby resetting counters CCH and CBR through an inverter only during the level-1 state of said signal TP3, said resetting being terminated when the signal TP3 is shifted to level-0 to allow entry of the clock pulses CP to said counters CCH, CBR through the line lCP.

Said counters CCH, CBR are reset through the gates A3, A6 at the start of printing operation by the level-0 state of the signal line l2 while the flip-flop FCP is reset through the gate A5 to supply a level-0 signal through the signal line lnR to the gates A3, A6 thereby continuing the reset state of said counters CCH, CBR. The counters CCH, CBR are also controlled by the forward and backward signals on the lines lF and lB respectively through the gates A3, A6 in such a manner that the counter CCH is enabled in the forward displacement by the signals lF=1 and lB=0 while the counter CBR is enabled in the backward displacement by the signals lF=0 and lB=1. Then in the level-1 state of the signal TP3 the flip-flop FCP is set to shift the signal line lnR to level-1, and the counting operation of said counters is enabled thereafter when said resetting is terminated by the level-0 state of the signal TP3. Upon completion of said counting operation, all the output ports Q0–Qn or Q0–Qm are in the level-1 state to provide a level-0 signal through a NAND gate ND1 or ND2 to reset the flip-flop FCP, whereby the counter CCH or CBR is also reset.

Also the flip-flop SRF is reset by said line l2 through an inverter i3 and an OR gate RF2 to open AND gates AF and AB. In the following the function of the circuit will be clarified in detail with reference to FIGS. 9 and 10.

Along with the forward displacement of the carriage CA in response to a print instruction signal, the light-emitting diode LE and the phototransistor PT supply timing signals TP through the amplifier AP. In response to a timing pulse TP(1) there are generated pulse signals TP1, TP2 and TP3 in succession, and in response to said signal TP3 the flip-flop FCP is set whereby the counter CCH receives and counts the clock pulses CP, releasing output signals to the ports Q0–Qn. In this state the counter CBR remains in the reset state through the gate A6 by the level-0 state of line lB, whereby the NAND gate ND2 releases a level-1 signal to open the gate A5.

During said counting of n pulses, an OR gate ORF supplies, through a signal line CCO, a level-1 signal to the AND gate A4, which also receives, through the signal line lT2, the signal TP2 generated in response to said timing pulse TP. Said timing pulses TP are generated by the displacement of the carriage CA as explained in the foregoing, so that the timing and pulse width of said pulses are related with the carriage speed.

Consequently, in response to a timing pulse indicating a low carriage speed such as the timing pulse TP(1) shown in FIG. 10, the signal TP2 is not released to maintain the gate A4 closed during the counting operation of the counter CCH, whereby the flip-flop SRF remains in the reset state achieved through the OR gate RF2 in response to the signal TP1 released prior to said signal TP2. In this state the signal line CBO leading from the counter CBR to the gate A7 is in the level-0 state due to the reset state of said counter CBR, whereby the gate A7 provides a level-0 signal to the OR gate RF1.

Because of said reset state of the flip-flop SRF the AND gates AF, AB are not affected to continue the forward displacement of the coil C.

Also in response to the signals TP(2), TP(3) and TP(4) the drive function of the motor coil C is not changed since the AND gate A4 does not release the logic porduct signal of the counter output signal CCO and the signal TP2, but the interval of the timing pulses becomes gradually smaller because the carriage speed is gradually increased by the continued drive. Thus, in response to the timing pulse TP(5), the gate A4 releases the logic product signal of the output signal CCO(4) supplied from the counter CCH through the gate ORF and of the signal TP2(5) to set the flip-flop SRF through a signal line A40.

Upon said setting the output $\bar{Q}$ thereof is shifted from level-1 to level-0 to close the gates AF and AB, thus deactivating the driver MD and terminating the coil drive. Even after said termination the carriage CA continues inertial displacement, however with a gradually decreasing speed due to the friction. At the succeeding signal TP3(5) the counter CCH is reset through the inverter and starts the counting operation again by the setting of the flip-flop FCP at the end of said signal TP3(5). Then in response to the signal TP1(6) corresponding to the succeeding timing pulse TP(6), the flip-flop SRF is reset through the gate RF2 to shift the output $\bar{Q}$ to level-1 whereby the gates AF, AB are opened to restart the coil drive.

Although the carriage speed is decreased in the period from the signal TP2(5) to the signal TP1(6) due to thus interrupted coil drive, the speed is still high at the signal TP(6) shown in FIG. 8, so that the gate A4 transmits the logic product signal of the output signal CCO(5) from the counter CCH and the signal TP2(6) in a similar manner as in the case of the timing pulse TP(5) to again set the flip-flop SRF, whereby the gates AF, AB are closed to interrupt the coil drive until the arrival of the signal TP1(7) corresponding to the succeeding timing pulse TP(7). At this point the counter CCH is reset by the signal TP3(6) and starts the counting operation again when the flip-flop FCP is set at the end of the signal $\overline{TP3(6)}$. Subsequently the flip-flop SRF is reset through the gate RF2 by the signal TP1(7) corresponding to the succeeding timing pulse TP(7), whereby the gates AF, AB are opened to restart the coil drive.

Thereafter the coil drive is controlled in the similar manner by the logic product of the signals TP2 and the counter output signals CCO, and is continued in response to the timing pulses TP(7) and TP(8) but is interrupted in response to TP(9) as in the case of timing pulses TP(5) and TP(6), thus achieving the speed control of the carriage CA based on the count n of the clock pulses CP by the counter CCH.

In the backward displacement of the carriage CA the counter CCH is deactivated but the counter CBR is enabled by the signal states lF=0 and lB=1. The count capacity m of the counter CBR is selected smaller than the count capacity n of said counter CCH, and the speed control is effected by said counter CBR in the backward direction in a similar manner but with a larger speed than in the forward displacement, thus enabling an increase in the printing speed.

The standard speed in said backward displacement is selected as fast as possible and preferably at a value allowing to prevent various troubles resulting from the high-speed collision of the carriage. However it is furthermore possible to increase the printing speed. Since the printing operation is not conducted during the backward displacement no consideration is required for the response frequency of the piezoelectric element, and it is therefore possible to further increase the aforementioned standard speed in the backward displacement or to effect the backward displacement at the maximum speed without the speed control as long as the troubles in the nozzle caused by the carriage collision are prevented. For this purpose rapid braking should be applied to the carriage immediately prior to the collision thereof. This is achieved by driving the carriage in the forward direction for a determined period when the carriage has reached the vicinity of the home position in the backward displacement to significantly reduce the carriage speed, and by reducing the motor drive voltage to slowly displace the carriage to the home position at the right-hand end, whereby it is rendered possible to prevent the ink leaking from the nozzle and the bubble formation in the sub-tank.

Figure 11:
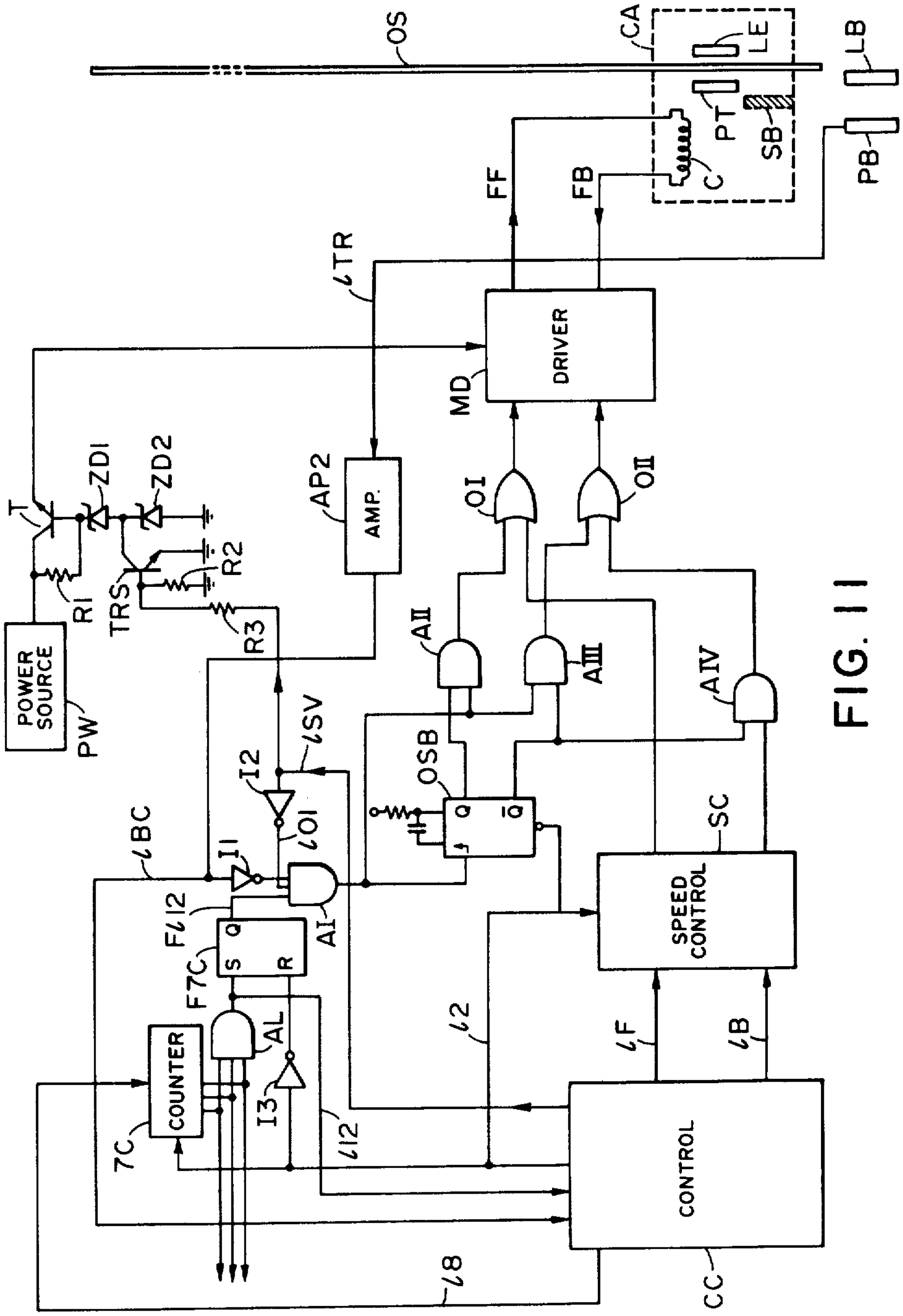
FIG. 11 is a block diagram showing still another embodiment of the present invention.

FIG. 11 shows an example of the circuit for achieving such drive. Until the completion of the printing of the seventh line in the 5×7 dot matrices, the three outputs of the line counter 7C are not all in the level-1 state, whereby the gate AL releases a level-0 signal to the signal line l12. Consequently a flip-flop F7C is not set to maintain the output from a gate AI in the level-0 state, whereby a one-shot multivibrator OSB to be triggered at the start of said output signal is not activated. Also gates AII, AIII provide level-0 signals due to the level-0 state of said gate AI, and a gate AIV is maintained open by the level-1 state of the output signal $\overline{Q}$ from said multivibrator OSB to transmit the output signals from the speed control unit SC to the driver MD through OR gates OI, OII, thus effecting the forward drive. At this state the driver MD receives a high voltage since a transistor TRS is turned off by the level-0 state of a signal line lSV, which is supplied as the level-1 through an inverter I2 to the gate AI.

Also in the reciprocating motion of the carriage CA, the arrival thereof in the home position area is detected by the displacement of the shield board SB between the light-emitting diode LB and the phototransistor PB. More specifically, at the arrival of the carriage CA at the home position, the shield board SB intercepts the light from the light-emitting diode LB to shift the signal line lTR to level-0 which is sensed through an amplifier AP2 and the signal line lBC. This home position signal is thus released even before the completion of the printing of the seventh line and opens the gate A1 through an inverter I1 whenever the carriage CA is located in the home position, but said gate A1 releases no output signal because of the level-0 state of the signal line Fl12 as the printing of the seventh line is not completed.

Now, upon completion of the printing of the seventh line in the forward displacement, the outputs of the line counter 7C become all level-1 to provide a level-1 signal to the line l12 whereby the coincidence circuit CC identifies said completion, said identification being utilized for effecting the paper feeding for a space between the print rows and the switching of the motor drive voltage. At the same time the flip-flop F7C is set by the signal line l12, and the gate AI is opened by the level-1 states of the lines Fl12 and lO1 to release a level-1 signal when the signal line lBC is shifted to level-0 state which is to be transmitted through the inverter I1.

In this state the signal lines lF and lB are respectively shifted to level-0 and level-1 to cause the backward displacement of the cariage CA towards the home position in the same manner as in the preceding print lines. Upon arrival of the carriage CA at the home position, the shield board SB shifts the output from the phototransistor PB to level-0, whereby the line lBC is shifted to level-0 through the amplifier AP2. Thus, upon arrival of the carriage at the home position after the completion of the printing of the seventh line, the gate AI releases a signal to activate the one-shot multivibrator OSB, thereby shifting the outputs Q and $\overline{Q}$ thereof respectively to level-1 and level-0. In this manner the gate AIV is closed to terminate the backward drive signals.

At the same time the gates AII, AIII respectively release a level-1 signal and a level-0 signal for a duration determined by said one-shot multivibrator OSB activated by the output signal from said gate AI. Said signals are supplied, respectively through the OR gates OI, OII to the driver MD to interrupt the backward drive and to effect the forward drive for said duration.

In this manner it is rendered possible to drastically reduce the carriage speed by the inverted motor drive at the arrival of the carriage CA at the home position area.

The gate AIV is reopened at the termination of the output signal from the one-shot multivibrator OSB, and the control unit CC, in response to the termination of the signal Q from said multivibrator OSB, shifts the signal line lSV to level-1 to turn on the transistor TRS, whereby the Zener diode ZD2 is shortcircuited to switch the motor drive voltage to the lower value. At the same time the output signal from the gate AI is shifted to level-0 through the inverter I2 to shift the output signals from the gates AII, AIII to level-0 state, whereby the signal lines lF and lB are respectively shifted to level-0 and level-1 to drive the carriage CA slowly with the lower voltage to the home position at the right-hand end.

At the start of the printing operation the signal line l2 is maintained at level-0 for a determined period to reset the line counter 7C, one-shot multivibrator OSB, speed control unit SC and flip-flop F7C through an inverter I3.

The above-explained control method in which the carriage is displaced quietly to the right-end home position without rapid collision allows to prevent the ink leaking or bubble introduction resulting from such collision, thus avoiding defective printing or stain formation and ensuring satisfactorily stable printing operation.

What I claim is:

1. A recording apparatus comprising:
   - a carriage having a recording head mounted thereon;
   - a motor for moving said carriage reciprocally in a recording direction, and at the predetermined rate in a return direction;
   - first detecting means for detecting the presence and absence of recording information and for coveying the recording information to said recording head;
   - second detecting means for detecting when said carriage is in a home position area;
   - protection means disposed adjacent to the home position area of said carriage for protecting said recording head; and
   - drive means, which operates upon detection by said second detecting means of the return of said carriage to the home position area, for driving said motor in said recording direction to continue recording of information when said first detecting means detects the presence of information to be recorded, and for continuing the return drive of said motor at a rate less than said predetermined rate when said first detecting means detects the absence of information to be recorded, thereby placing said carriage at a position where said recording head thereon contacts said protection means.

2. A recording apparatus according to claim 1, wherein said recording head comprises an ink jet nozzle, and wherein said carriage comprises an ink tank mounted thereon.

3. A recording apparatus according to claim 1, wherein said motor comprises a linear motor.

4. A recording apparatus according to claim 2, wherein said carriage is adapted to softly come into contact with a damper to prohibit bubbles from being generated within said ink tank.

5. A recording apparatus according to claim 3, wherein said linear motor comprises an elongated permanent magnet arranged perpendicular to an advancing direction of a recording paper, a slit plate of non-magnetic material arranged in parallel with said permanent magnet, and light emitting and receiving element mounted on said carriage for detecting a position of said carriage in cooperation with slits of said slit plate.

* * * * *